United States Patent [19]

Sakamoto et al.

[11] Patent Number: 4,924,162
[45] Date of Patent: May 8, 1990

[54] METHOD OF CONTROLLING A SIDE SUPPORT FOR USE WITH A VEHICLE SEAT AND DEVICE FOR USE IN SUCH METHOD

[75] Inventors: Takao Sakamoto; Kiyotaka Takizawa, both of Akishima, Japan

[73] Assignee: Tachi-S Co., Ltd., Tokyo, Japan

[21] Appl. No.: 304,713

[22] Filed: Feb. 1, 1989

[51] Int. Cl.⁵ .................... A47C 7/46; G05B 19/18
[52] U.S. Cl. .................... 318/569; 318/560; 318/466; 297/284
[58] Field of Search .............. 318/466, 467, 468, 469, 318/470, 560, 569; 297/284, 311, 330, 353, 452, 460, 464, 486; 296/63, 64, 68.1, 147

[56] References Cited

U.S. PATENT DOCUMENTS

| | | | |
|---|---|---|---|
| 4,401,928 | 8/1983 | Kamijo et al. | 318/468 X |
| 4,463,426 | 7/1984 | Caddick et al. | 318/466 X |
| 4,659,145 | 4/1987 | Obersteiner | 297/330 |
| 4,698,571 | 10/1987 | Mizuta et al. | 318/103 X |
| 4,707,788 | 11/1987 | Tashiro et al. | 364/424.05 |
| 4,727,302 | 2/1988 | Mizuta et al. | 318/567 |

FOREIGN PATENT DOCUMENTS

| | | | |
|---|---|---|---|
| 57-80932 | 5/1982 | Japan | 297/330 |
| 58-105834 | 6/1983 | Japan | 297/330 |
| 2033613 | 5/1980 | United Kingdom | 297/330 |

*Primary Examiner*—Bentsu Ro
*Attorney, Agent, or Firm*—Browdy and Neimark

[57] ABSTRACT

A method of controlling a side support device which is provided in a seat for a vehicle such as an automobile and the like. In the method, an arbitrary support position can be set manually by driving and controlling a motor by means of a manual switch operation. Also, a closed position and an open position which are respectively present close to the arbitrary support position can be respectively set with one touch automatically by driving and controlling the motor by means of an automatic switch operation.

4 Claims, 5 Drawing Sheets

METHOD OF CONTROLLING A SIDE SUPPORT FOR USE WITH A VEHICLE SEAT AND DEVICE FOR USE IN SUCH METHOD

BACKGROUND OF THE INVENTION

1. Field of the Invention

The present invention relates to a method of controlling a side support for use with a seat in a vehicle in which a motor is driven to control the operation of the side support according to the operating conditions of the vehicle to thereby prevent an occupant of the seat from losing his or her sitting position and a side support device for use in such method.

2. Description of the Prior Art

When a vehicle goes around a curve, centrifugal force is generated which may push against an occupant of the vehicle seat laterally. Because of this, the occupant loses his or her sitting position, so that the occupant finds it difficult to support a predetermined sitting position as well as feels uncomfortable. Particularly, when the occupant is a driver of the vehicle, if the driver loses his or her sitting position, then the control of the vehicle can be significantly reduced so that the safe driving of the vehicle cannot be achieved.

In view of this, conventionally a side support device has been supplied which can prevent the occupant from losing his or her sitting position to thereby support the sitting position of the occupant and such side support device has been mounted to the driver's seat and the like.

Specifically, the side support device includes a side support which is disposed in a seat back of the vehicle seat in such a manner that it is able to surround the upper body of the occupant from both sides thereof. That is, the side support is arranged such that it can hold the upper body of the occupant firmly from both sides thereof to restrict the movements of the occupant's upper body to thereby support the sitting position of the occupant by force. However, such constant and forcible holding of the occupant's upper body by the side support deprives the occupant of movement of the freedom of the upper body and impairs the comfortable riding feeling of the occupant, so that the occupant gets uncomfortable and tired. To avoid this, according the above-mentioned conventional side support device, the side support is adapted such that it is normally set at an open position where the side support does not push against or hold between the occupant and, only in case of need, it can be moved to a closed position.

As a method of controlling the operation of the side support, a method is widely known which uses lateral acceleration (that is, accelerations in the right and left directions) as a parameter. The lateral acceleration can be detected directly by means of an acceleration sensor (for example, Japanese Laid-open Utility Model Publication No. 60-97633), or can be found from a vehicle speed, a curvature of the curve or the like (for example, Japanese Laid-open Patent Publication No. 61-67638). If the lateral acceleration goes beyond a reference value, then the side support is moved to the closed position. Also, the parameter is not limited to the acceleration, but, for example, in Japanese Laid-open Utility Model Publication No. 60-97634, the vehicle speed and the steering angle of a driving wheel are used as the parameters, and, in Japanese Laid-open Patent Publication No. 60-197436, the curvature of a curve and the vehicle speed are employed as the parameters.

Also, there is known a so-called power type of side support controlling method in which the side support can be moved directly by driving and controlling a motor by means of operation of a switch. In this method, so long as the switch is depressed on, the motor can be driven continuously, whereby an arbitrary closed or open position can be set manually.

As described above, in the above-mentioned well-known side support controlling methods, the disturbance of the sitting position of the occupant occurring when the vehicle goes around a curve is taken into consideration. However, the running conditions of the vehicle that can disturb the sitting position of the occupant and impair the riding comfort of the occupant are not always limited to the above-mentioned curve running condition. For example, when the vehicle runs along bad roads, the occupant suffers from upward and downward accelerations which cause the occupant to lose his or her sitting position and thus impair the riding comfort of the occupant. In an extreme case, the occupant may bite his or her own tongue. Also, the upward acceleration may be so great that the occupant can be thrown up from the seat to collide with the ceiling of the vehicle. In view of this, it is preferable to be able to move the side support to the closed position as the occasion demands when driving on bad roads.

However, the above-mentioned well-known side support controlling methods are incapable of coping with the bad roads driving conditions of the vehicle properly, since they are developed mainly to control the side support in the curve running conditions and thus, as discussed before, the lateral acceleration, the vehicle speed and the wheel steering angle, or the like are used as the parameters.

Also, in the above-mentioned prior art side support controlling methods, after the side support is moved from the open position to the closed position, for example, if the lateral acceleration as the parameter goes below the reference value and then a given period of time elapses, then the side support is moved back to the open position. For this reason, when the curves are repeatedly traversed in the hill or mountain areas, then the side support is opened and closed repetitively with a high frequency, which annoys the occupant. That is, such methods are not preferred from the viewpoints of the safety driving, the mental fatigue of the occupant and the like.

Further, in the above-mentioned power type of side support controlling method, during driving, in order to move the side support, the switch must be depressed continuously for a long period of time (up to 8 seconds). Therefore, control of the side support during driving is complicated and provides an obstacle to safe driving, that is, such control cannot be achieved easily.

SUMMARY OF THE INVENTION

The present invention aims at eliminating the drawbacks found in the above-mentioned prior art methods and devices.

Accordingly, it is an object of the invention to provide a method of controlling a side support for use with a seat in a vehicle, which is capable of controlling the side support quickly and easily and eliminates the need to open and close the side support frequently.

In order to achieve this object, in a method of controlling a side support for use with a vehicle seat according to the invention, an arbitrary support position can be manually set by driving and controlling a motor by means of a manual switch operation. Also, a closed position and an open position, both of which are present adjacent to the arbitrary support position, can be automatically set by one touch, respectively, by driving and controlling the motor by means of an automatic switch operation.

As mentioned above, according to the vehicle seat side support controlling method of the invention, once the arbitrary support position is set, the side support can be controlled by one touch, while the vehicle is moving, by depressing an automatic switch. Because of this, control of the side support during the driving of the vehicle can be achieved quickly and easily, which can prevent the occupant of the seat from losing his or her sitting position.

Also, once set, the closed position remains unchanged unless it is removed by choice by the occupant. Due to this, even in the curve driving conditions or other driving conditions, the possibilty that the side support may be opened and closed frequently regardless of the occupant's will is eliminated. Therefore, the occupant does not get tired mentally and safe driving can be assured.

Further, not only when the vehicle moves around a curve but also when it goes along bad roads or accelerates or decelerates suddenly, the closed position can be set quickly and easily to thereby prevent the occupant from losing his or her sitting position.

It is another object of the invention to provide a device by use of which the above-mentioned method can be enforced in a proper manner.

In attaining the above object, according to the invention, a side support device is provided which comprises: a motor with a rotation sensor for moving a side support; a motor drive circuit for driving the motor; a counter memory for storing the number of rotations of the motor; switch means including a manual switch for controlling the drive of the motor to thereby set an arbitrary support position and an automatic switch for setting a closed position and an open position adjoining the arbitrary support position respectively; and a central processing unit.

Therefore, according to the side support device of the invention, the above-mentioned side support controlling method can be executed properly so that, even in the hard driving conditions of the vehicle such as the curves, bad roads driving, suddenly accelerating and decelerating driving and the like, the occupant of the vehicle seat can be prevented from losing his or her sitting position, whereby a predetermined sitting position can be secured.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
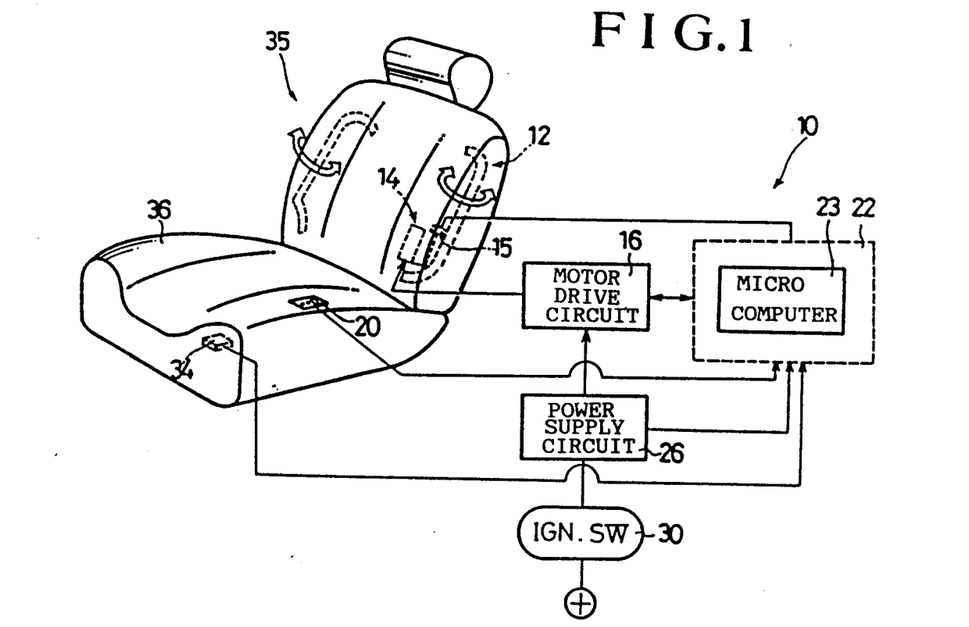
FIG. 1 is a schematic block diagram of a side support device for use with a vehicle seat according to the invention.

As shown in FIG. 1, a side support device 10 for use with a seat in a vehicle according to the present invention comprises a side support 12, a motor 14 which is provided with a rotation sensor, a motor drive circuit 16 which is used to drive the motor 14, a counter memory 18 (see FIG. 2), switch means 20, and a central processing unit 22.

The motor 14 is arranged such that it is provided with a rotation sensor 15 such as a reed-switch type of sensor or the like. In general, a DC motor is used for the motor 14. And, by driving the motor 14, the side support 12 can be moved between an open position and a closed position thereof and, when the side support 12 is situated at the closed position, it pushes and supports an occupant of the vehicle seat from both sides thereof to thereby prevent the occupant from losing his or her sitting position. The number of rotations of the motor 14 that is detected by the rotation sensor 15 is input to the central processing unit 22, where it is compared with the number of rotations stored in the counter memory 18.

Figure 2:
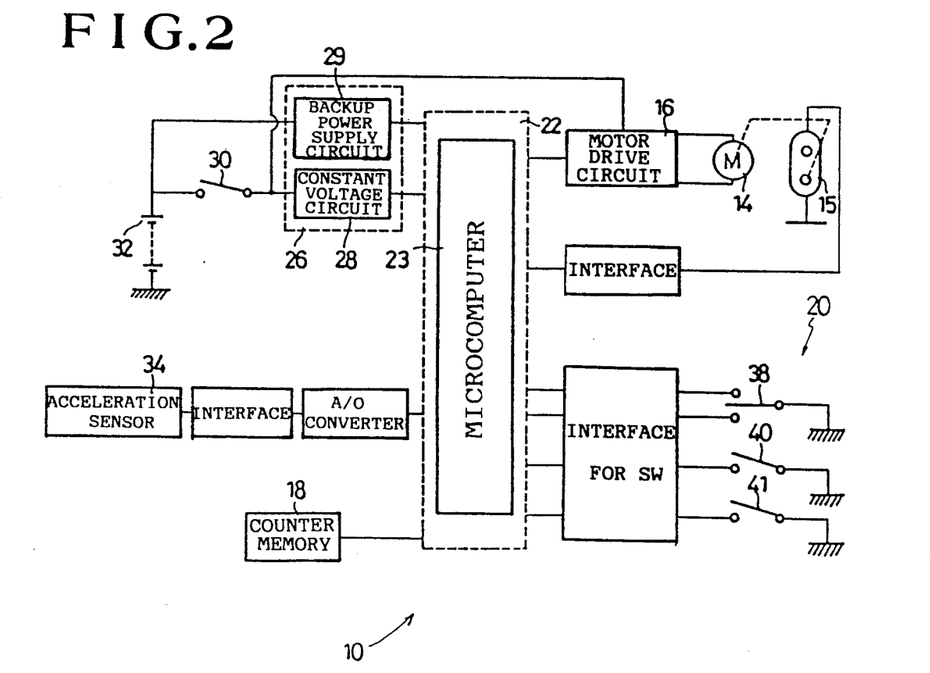
FIG. 2 is a detailed block diagram of a central processing unit and its peripheral parts.

The central processing unit 22 includes a microcomputer 23 and the microcomputer 23 processes the input in accordance with a program which is stored therein and then generates a proper control signal. The control signal is output to, for example, a motor drive circuit 16, so that the motor 14 can be driven.

Also, the motor drive circuit 16 and central processing unit 22 are respectively connected to a power supply circuit 26. The power supply circuit 26, as can be understood from FIG. 2 in addition to FIG. 1, includes a constant voltage circuit 28 and a backup power supply circuit 29 for holding the counter memory 18. The constant voltage circuit 28 is connected via an ignition switch 30 to the positive electrode of a battery 32.

Figure 3:
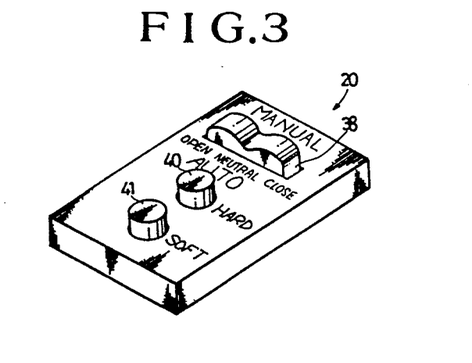
FIG. 3 is a perspective view of an embodiment of switch means employed in the invention.

Further, in the illustrated embodiment, as shown in FIG. 1, the side support device 10 further includes an acceleration sensor 34. The acceleration sensor 34 is preferably arranged so as to be able to detect upward and downward, forward and backward, and rightward and leftward (lateral) accelerations which act on the vehicle seat 35, and the sensor 34 is disposed on the lower surface of a seat cushion 36. With this type of acceleration sensor 34, driving on bad roads can be recognized by the upward and downward accelerations, sudden acceleration and deceleration driving can be recognized by the forward and backward accelerations, and driving around curves can be recognized from the lateral accelerations, respectively. The switch means 20 is arranged such that it is able to control the driving of the motor 14 to thereby set an arbitrary support position as well as set the closed and open positions respectively adjoining the arbitrary support position with one touch, respectively. For example, the switch means 20, as shown in FIG. 3, includes a manual switch 38, and two kinds of automatic switches, namely, a hard switch 40 (for hard support) and a soft switch 41 (for soft support).

In the illustrated embodiment, the manual switch 38 is a seesaw type of switch. Specifically, while the manual switch 38 is normally situated at a neutral position, if it is depressed towards the right or left, then the motor can be continuously driven in a forward or reverse direction and, if the depressing of the switch 38 is stopped (that is, the pressing force is removed therefrom), the manual switch 38 can return automatically to the neutral position. By operating the manual switch 38, the occupant can move the side support to an arbitrary position to set an arbitrary support position. That is, after sitting down the occupant depresses on the manual switch 38 in the close display direction, or in the right direction to thereby drive the motor 14 continuously. When the side support 12 reaches the arbitrary support position, if the depressing force on the manual switch 38 is removed, then the arbitrary support position can be set and thus the manual switch 38 can return to the neutral position. Here, when the arbitrary support position is set, then the counter memory 18 is reset so that the number of counts (the value of the counter) is caused to return to zero. On the other hand, if the manual switch 38 is pressed down on in the left direction, then the motor 14 is driven in the direction of the open position to thereby open the side support 12, so that a so-called full-open position, for example, for the occupant to be able to climb into or out of the vehicle, can be set.

On the other hand, the hard and soft switches 40 and 41 are arranged such that they are respectively capable of setting the above-mentioned closed and open positions with one touch, both positions adjoining the arbitrary support position. In particular, the hard switch 40 may be operated when the occupant wants a relatively hard support by the side support. Also, the soft switch 41 may be operated if the support at the arbitrary support position set by the occupant is too hard and thus the occupant wants a gentle support at the open position. In other words, if the hard switch 40 is pressed down, then the motor 14 is driven in the direction of the closed position until the number of counts previously stored in the counter memory 18, for example, +n (the number of counts is to be displayed as+in the close direction and as−in the open direction) is obtained, thereby setting the closed position. At the closed position, the side support 12 can support the occupant strongly enough to prevent the occupant from losing his or her sitting position. After then, if the hard switch 40 is pressed down again, then the motor 14 is driven on in the open position until the number of counts in the counter memory 18 goes to zero, thereby setting an arbitrary support position again.

Also, when the soft switch 41 is depressed, then the motor 14 is driven on in the open direction until the number of counts reaches the number of counts that has been previously stored, for example, −m, thereby setting the open position. And, if the soft switch 41 is pressed down again, then the motor 14 is driven on in the close direction until the value of the counter memory 18 becomes zero, thereby setting an arbitrary support position again.

In the illustrated embodiment, the hard and soft switches 40 and 41 are respectively formed of a self-maintaining type of a pushbutton switch which, once depressed, is maintained in the depressed state (on state). However, the invention is not limited to this.

But, alternatively, the switch means 20 may be composed of other switches. For example, the manual switch 38 may be composed of a manual close switch and a manual open switch.

The upward/downward, forward/backward, and right/left accelerations G that are detected by the acceleration sensor 34 are transmitted to the central processing unit 22 and are then compared by the microcomputer 23 with their corresponding reference values that have been previously stored in the microcomputer 23. And, when the side support 12 is not situated in the closed position (that is, when the number of counts of the counter memory is less than +n), if the acceleration exceeding the reference value Gs is found, then a control signal to drive the motor 14 on in the close direction until the number of counts reaches +n is output from the microcomputer 23 to the motor drive circuit 16. In other words, even if the closed position is not set when a greater acceleration occurs suddenly, the side support 12 can be moved to the closed position, with the result that the occupant is surely prevented from losing his or her sitting position. Here, if any one of the detected upward/downward, forward/backward and right/left accelerations G exceeds the corresponding reference value Gs, then the above-mentioned control signal is output to the motor drive circuit 16.

Figure 4:
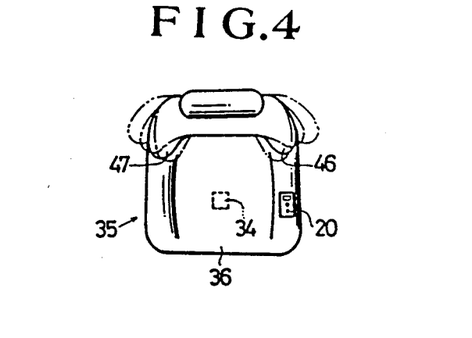
FIGS. 4 and 5 are respectively schematic plan and front views of a vehicle seat provided with a side support device.
Figure 5:
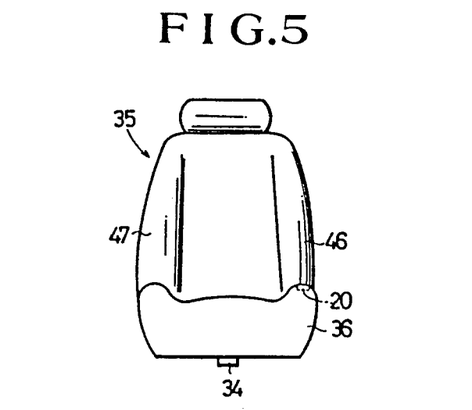

The side support 12 is arranged so as to be able to press against the upper body of the occupant from both sides thereof to thereby support it firmly and also the side support 12 can be moved between a closed position where it presses against the occupant's upper body from both sides thereof to thereby be able to support it firmly and an open position where it does not give the occupant's upper body such support force. Also, since the side support 12 provides an obstacle when the vehicle is stopping or backing, the side support 12 is moved to a full-open position where it is open to the maximum extent, whereby the occupant is able to climb into or out of the vehicle with ease. That is, the ability to enter and leave the vehicle can be enhanced. In the present invention, the full-open position can be set by operating the manual switch 38. That is, as can be seen from FIG. 4, when the driver or any other occupant climbs out of or into the vehicle, the side support 12 is moved to the full-open position shown by a two-dot chained line. When the driver (and other occupants) is seated on the seat and starts the vehicle, the side support 12 is moved to the arbitrary support position shown by an actual line and is maintained there (see FIG. 5). During the driving of the vehicle, the side support 12 can be moved, as occasion demands, between the closed and open positions (both of which are shown by a one-dot chained line) adjoining the arbitrary support position and situated oppositely with the arbitrary support position therebetween.

The side support 12 is generally constructed in the following manner. The motor 14 can be driven by the control signal from the motor drive circuit 16 to thereby rotate right and left support stays 42, 43 simultaneously, as can be understood from FIG. 6. The rotation of the motor 14 is detected by the rotation sensor 15 which is composed of a sensor of a lead switch type and is incorporated in the motor 14. In the illustrated embodiment, these two support stays 42, 43 are interconnected with each other through a interlocking link 44, whereby the support stay 42 can be driven directly by the driving force of the motor 14 and the driving force can be transmitted to the support stay 43 through the interlocking link 44. The support stays 42, 43 are located within side support sections 46, 47 respectively (see FIGS. 4 and 5) and, as the support stays 42, 43 are rotated, the side support sections 46, 47 are moved between the closed and open positions.

Figure 6:
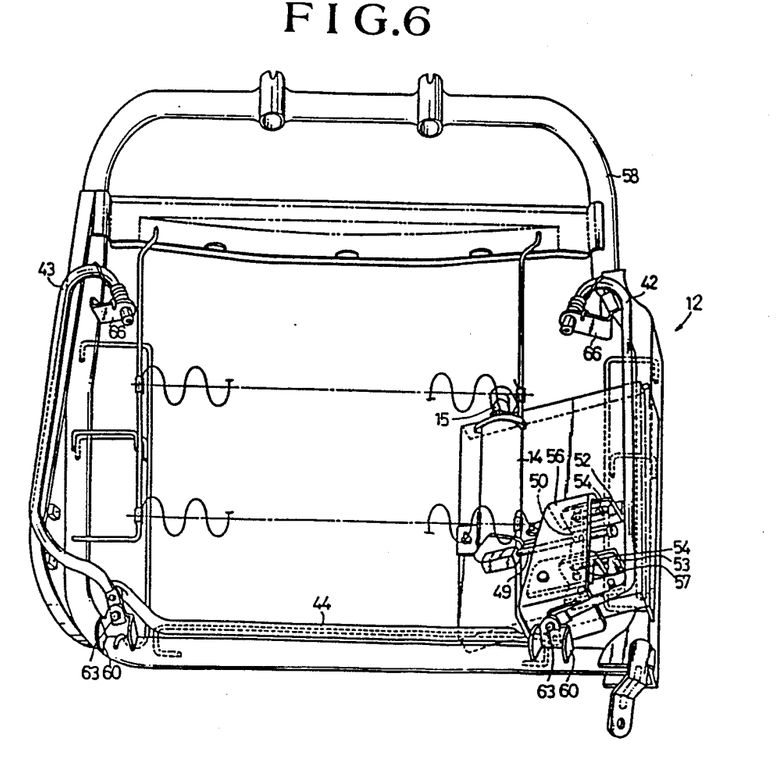
FIG. 6 is a schematic perspective view of a side support in the side support device.
Figure 7:
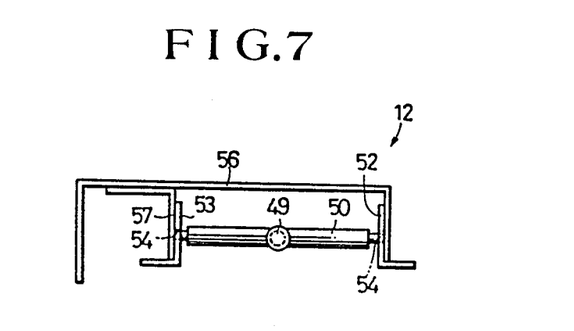
FIG. 7 is a right side view of a support plate according to the invention.

Describing the structure of the side support 12 along the transmission path of the driving force, as shown in FIG. 6, the motor 14 has an output shaft 49 which is composed of a lead screw. The lead screw 49 extends out through a threaded bore formed in a shaft 50. As can be understood well from FIG. 7 in addition to FIG. 6, the ends of the shaft 50 extend out respectively by means of elongated guide grooves 54 respectively formed in support plates 52, 53, and are then fixed to the right wall of the support frame 56 and a support plate 57, respectively. Here, the support plates 52, 53 are respectively fixed to a seat back frame 58, and the support plate 57 is fixed to the support frame 56. A bracket 60 is fixed to a seat back frame 58 and one end of the support stay 42 is pivotally connected to the bracket 60 by means of a pin 63. One end of the interlocking link 44 is secured to the left wall of the support frame 56 by a pin and the leading end of the interlocking link 44 is secured to the leading end of the support stay 42 by a pin. Also, the other end of the interlocking link 44 is coupled to the support stay 43 and one end of the support stay 43 is pivotally connected to the bracket 60, which is situated left, by the pin 63. As a matter of fact, the remaining ends of the support stays are rotatably mounted to a bracket 66.

In such structure, if the motor 14 is driven, then the support stays 42, 43 are rotated about the pin 63, respectively. In other words, if the motor 14 is driven and thus the lead screw 49 is caused to rotate, then the shaft 50, which is in threaded engagement with the lead screw 49, slides right and left along the guide grooves 54. The support frame 56 slides integrally with the shaft 50 and together with the interlocking link 44. For example, when the support frame 56 slides right in FIG. 6, then the interlocking link 44 also slides right, with the result that the support stay 43 is pulled by the interlocking link 44 and is thus rotated clockwise (inwardly, or in the close direction) about the pin 63. Also, the support stay 42 is pushed by the interlocking link 44 and is thus rotated counter-clockwise (inwardly) about the pin 63. On the other hand, if the support frame 56 and the interlocking link 44 slide left, then the support stay 43 is pushed by the interlocking link 44 and is thus rotated counter-clockwise (outwardly, in the open position), and the support stay 42 is pulled by the interlocking link 44 and is thus rotated clockwise (outwardly). In this manner, the support stays 42, 43 rotate always in the same direction to thereby rotate the side support sections 46, 47 in the same direction as well, whereby the side support 12 can be moved in the open or close direction.

The structure of the side support 12 mentioned above is only an example, and the invention is not limited to this. For example, two motors may be used instead of the motor 14 and the rotations of the support stays 42, 43 may be controlled by the two motors individually.

Now, description will be given below of the side support controlling method by use of the side support device 10 constructed in the above-mentioned manner, in detail, with reference to the flow charts shown in FIGS. 8 and 9. At first, after the occupant is seated in the vehicle seat, the occupant turns on the main switch of the side support device 10. Usually, the ignition switch 30 doubles the main switch and, therefore, by turning on the ignition switch 30, the main switch can be turned on automatically (70). After then, the occupants can set the support position that is best for normal driving of the vehicle, that is, the arbitrary support position that corresponds to the occupant's physical features. To attain this, the occupant only has to press down on the manual switch 38 in the right direction (that is, in the close display direction).

In the central processing unit 22, whether the hard switch 40 is on or not (72), whether the acceleration G detected by the acceleration sensor 34 is not less than the reference value Gs (74), and whether the soft switch 41 is on or not (76) are checked, respectively. As a matter of course, because the hard switch 40 and soft switch 41 are both off and the acceleration G is less than the reference value Gs, they are all found to be "NO". And, assuming that an unknown number x=0 in a subroutine (78), in the flow chart in the subroutine that is shown in FIG. 9, whether the number of counts is not less than 0 is checked (202). However, this is found as "NO" and, therefore, the program reaches the exit of the subroutine immediately.

Figure 8:
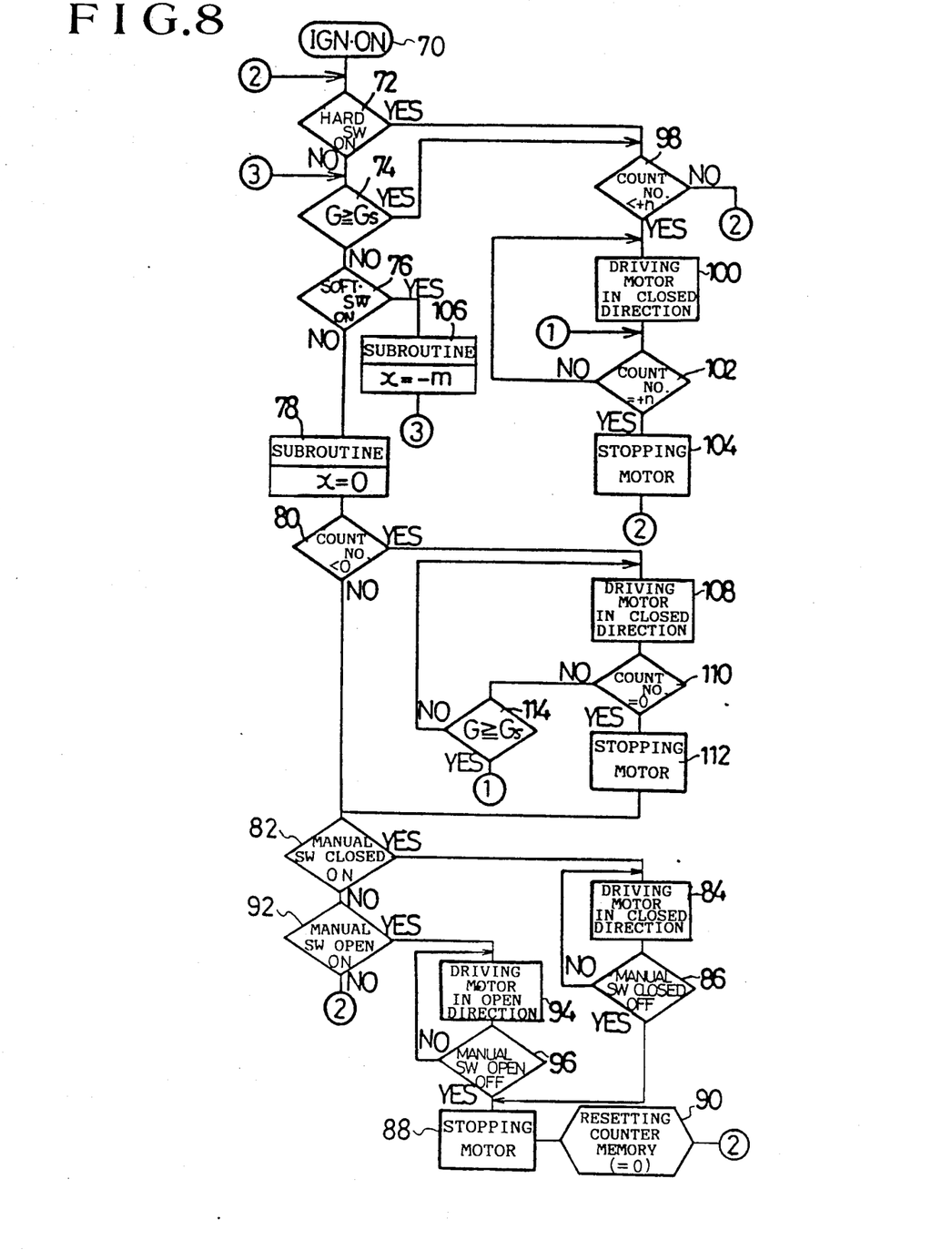
FIGS. 8 and 9 are flow charts of a side support control method according to the invention.
Figure 9:
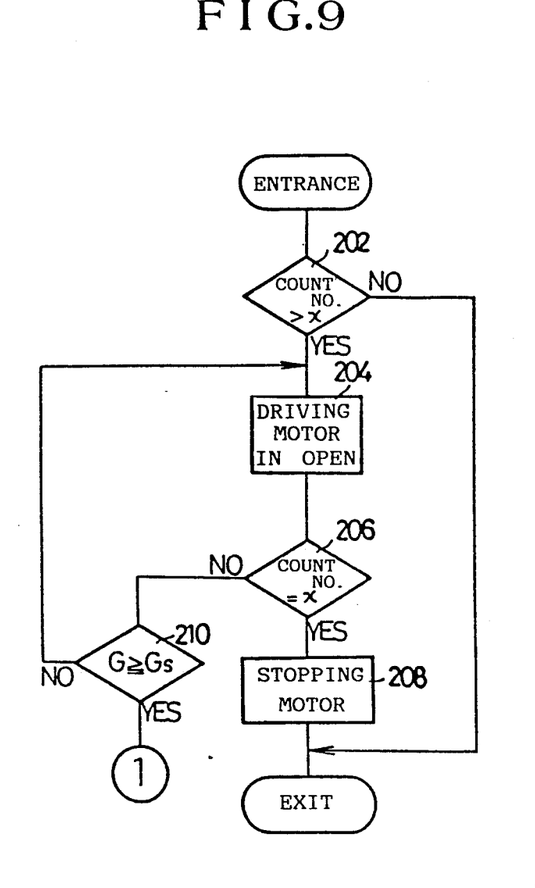

Then, as shown in FIG. 8, whether the number of counts is less than zero or not is checked (80) and this is found as "NO", and further whether the manual switch 38 is closed or not is checked (82). Because the manual switch 38 is closed, this is found as "YES" and thus the motor 14 is driven to the arbitrary support position (84). After it is confirmed that the manual switch 38 is turned off (86), the motor 14 is caused to stop (88). Then, the counter memory 18 is reset and the number of counts is set to zero (90). If the motor 14 is driven beyond a desired support position, then the manual switch 38 is open (92) to thereby drive the motor 14 in the open direction (94) and, thereafter, the manual switch 38 is turned off (96) to thereby set an arbitrary support position.

When the vehicle comes near to mountain roads or bad roads and thus the occupant wants a stronger support, then the hard switch 40 is pressed down to turn on. In this case, because the hard switch 40 is on, in (72) "YES" is found. Also, whether the number of counts is less than the previously stored number of counts +n or not is checked (98) and this is found as "YES", whereby the motor 14 is driven in the close direction (100). And, the motor 14 is driven on in the close direction until the number of counts reaches +n (102, 104), whereby the closed position is set.

After then, if the vehicle enters a normal road and the strong support is not necessary, then the hard switch 40 is depressed down again to turn off. Consequently, in a subroutine (202) shown in FIG. 9, whether the number of counts is not less than zero is checked. Here, because the number of counts is +n, "YES" is found, whereby the motor 14 is driven in the open direction (204). And, when the number of counts reaches zero (206), then the motor 14 is caused to stop (208) so that the original position, that is, the arbitrary support position is set again.

On the other hand, if the occupant feels the support too strongly at the set arbitrary support position and thus wants it weaker, then a soft switch 41 may be pressed down. When the soft switch 41 is turned on, then the motor 14 is driven in the open direction until x=−m in the subroutine, thereby setting the open position. In other words, in (202), whether the number of counts is not less than −m or not is checked and "YES"

is found because the number of counts is zero, whereby the motor 14 is driven in the open direction (204). If the number of counts becomes −m (x=−m) (206), then the motor 14 is caused to halt (208), thereby setting the open position.

After then, if the soft switch 41 is depressed again to turn off, then, in (80) "YES" is found, whereby the motor 14 is driven in the close direction (108). And, when the number of counts reaches zero (110), then the motor 14 is caused to stop (112) and the arbitrary support position is set again.

The acceleration sensor 34 is always in operation while the vehicle is running and the upward/downward, forward/backward and right/left accelerations G detected by the acceleration sensor 34 are input to the central processing unit 22 and are then compared with the corresponding reference values Gs by the microcomputer 23, respectively. For example, if the arbitrary support position or the open position is set, then "NO" is found in (72). If whether G≧Gs is found "YES" (74), then whether the number of counts is less than +n or not is checked (98). In this case, because the number of counts is less than +n, "YES" is found, whereby the motor 14 is driven in the close direction (100) and, when the number of counts becomes +n (102), then the motor 14 is caused to stop (104) to thereby set the closed position.

Also, if whether G≧Gs is found "YES" due to action of a sudden and big acceleration occurring midway when depressing the soft switch 42 or midway when depressing the soft switch 41 again (114, 210), then the closed position is similarly set (114, 210).

As described above, according to the invention, after the arbitrary support position is set by the occupant, the occupant is able to set the closed or open position according the occupant's judgement by depressing either the hard switch 40 or the soft switch 41. Also, if the hard switch 40 or the soft switch 41 is pressed down again to turn off, then an arbitrary support position can be set again.

Also, if once the closed position is set, the closed position is maintained unless the hard switch 40 is pressed down again or the manual switch 38 is operated according to the judgements of the occupant. For this reason, the need for the side support 12 to be frequently opened and closed repeatedly is eliminated and also the possibility of the occupant being mentally fatigued is avoided.

Further, according the above-mentioned side support controlling method, even along bad roads and suddenly accelerating or decelerating driving besides moving through curves the side support can be controlled quickly and easily to thereby be able to cope with various kinds of hard driving conditions.

In addition, according to the present invention, due to the combination with the acceleration sensor, even when the driving conditions of the vehicle are suddenly changed because of driving around curves or along bad roads to thereby produce an unexpected and great acceleration, the closed position can be set automatically. Therefore, the invention is able to cope with such sudden changes of driving quickly and surely to thereby prevent the occupant from losing his or her sitting position.

It should be understood, however, that there is no intention to limit the invention to the specific forms disclosed, but on the contrary, the invention is to cover all modifications, alternate constructions and equivalents falling within the spirit and scope of the invention as expressed in the appended claims.

For example, although in the illustrated embodiment the side support device 10 is mounted to the seat back of the vehicle seat and is adapted to be able to support the upper body of the occupant, alternatively, it may be mounted to the seat cushion so as to be able to support the femoral region of the occupant.

What is claimed is:

1. A method of controlling a side support for use with a seat in a vehicle comprising the steps of driving a motor according to operating conditions of the vehicle to thereby move the side support between a closed position for supporting an occupant from both sides thereof to thereby prevent the occupant from losing his or her sitting position and an open position where the side support is kept spaced apart from the occupant;

setting an arbitrary support position manually by driving and controlling said motor by means of operation of a manual switch;

automatically setting the closed and open positions, both adjoining said arbitrary support position, by driving and controlling said motor by means of operation of an automatic switch respectively;

said motor including a rotation sensor and further comprising the steps of detecting the number of rotations of said motor by said rotation sensor;

storing the number of rotations in a counter memory;

driving said motor continuously if said manual switch is depressed to thereby set said arbitrary support position;

resetting said counter memory when said arbitrary support position is set to thereby set the number of counts to zero;

driving said motor in the direction of said closed or open position if a hard switch of a self-maintaining type or a soft switch of a self-maintaining type is depressed, until said number of counts reaches a pre-set value, to thereby set said closed or open position; and thereafter, driving said motor until said counter memory is set to zero if said hard or soft switch is depressed again to thereby set said arbitrary support position.

2. A method as set forth in claim 1, further comprising when said arbitrary support position or open position is set, if any of upward/downward, forward/backward and right/left accelerations detected by an acceleration sensor exceeds a predetermined set value, then driving said motor in said closed position direction to thereby set said closed position.

3. A side support device for use with a seat in a vehicle, comprising:

a side support movable between a closed position where the side support presses against an occupant from both sides thereof to support the occupant so as to prevent the occupant from losing his or her sitting position and an open position where it is kept apart from the occupant;

a motor with a rotation sensor for moving said side support;

a circuit for driving said motor;

a counter memory for storing the number of rotations of said motor;

switch means including a manual switch for controlling driving of said motor to thereby set an arbitrary support position and an automatic switch for controlling the driving of said motor to said closed position and open position, both adjoining said arbitrary support position;

a central processing unit for controlling operation of said device;

said manual switch of said switch means being arranged such that if it is depressed, then said circuit drives said motor continuously to thereby set said arbitrary support position, and, if said arbitrary support position is set, then said counter memory is reset to thereby set the number of counts to zero;

said automatic switch of said switch means including a self-maintaining type hard switch which, when depressed, drives said motor from said arbitrary support position in the direction of said closed position until the number of counts reaches a pre-set value to thereby set said closed position and, thereafter, when depressed again, drives said motor in the direction of said open position until said counter memory is set to zero to thereby set said arbitrary support position, and a self-maintaining type soft switch which, when depressed, drives said motor from said arbitrary support position in the direction of said open position until said number of counts reaches another pre-set value to thereby set said open position and, thereafter, when depressed again, drives said motor in the direction of said closed position until said counter memory is set to zero to thereby set said arbitrary support position.

4. A side support device as set forth in claim 3, further comprising an acceleration sensor for detecting upward/downward, forward/backward and right/left accelerations connected to said central processing unit and wherein said acceleration sensor is arranged such that, while said arbitrary support position or said open position is set, if any of said accelerations detected by said acceleration sensor exceeds a predetermined set value, then said circuit drives said motor in the direction of said closed position to thereby be able to set said closed position.

* * * * *